C. A. Newton. Basin Cock.
110387  PATENTED DEC 20 1870
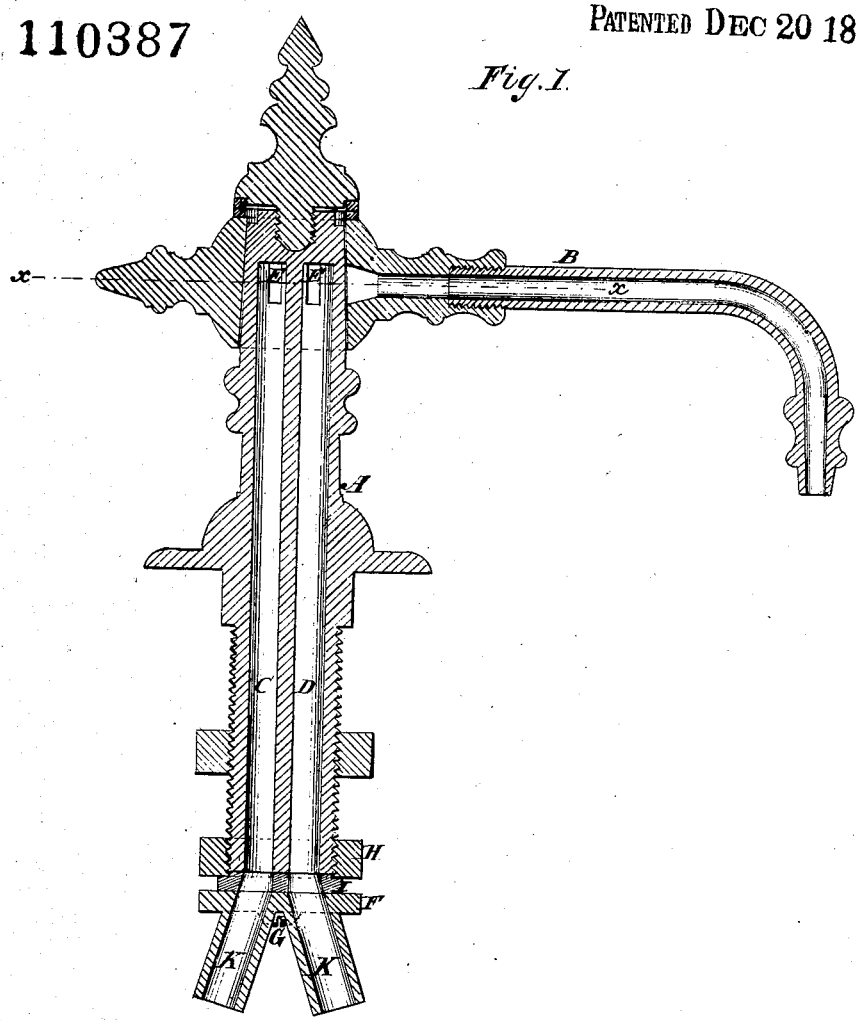
Fig. 1.
Fig. 2.
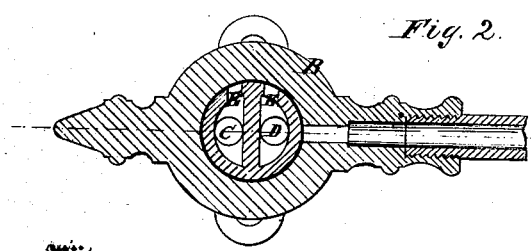
Witnesses:
E. Wolff
L. S. Mabee
Inventor:
C. A. Newton
per Munn & Co.
Attorneys.

United States Patent Office.

CHARLES A. NEWTON, OF PROVIDENCE, RHODE ISLAND.

Letters Patent No. 110,387, dated December 20, 1870.

IMPROVEMENT IN BASIN-COCKS.

The Schedule referred to in these Letters Patent and making part of the same.

*To all whom it may concern:*

Be it known that I, CHARLES A. NEWTON, of Providence, in the county of Providence and State of Rhode Island, have invented a new and useful Improvement in Basin-Cocks; and I do hereby declare that the following is a full, clear, and exact description thereof, which will enable others skilled in the art to make and use the same, reference being had to the accompanying drawing forming part of this specification.

My invention relates to the joint formed between the water-pipes and the double-tubed basin-cocks usually employed to furnish a supply of hot and cold water to bath and bed-rooms.

My invention consists in interposing between the basin-cock and water-pipes a double tube, having a flange at its upper end, which is fastened to a corresponding adjustable nut on the tubes of the basin-cock.

Figure 1 is a sectional elevation of my improved cock, and

Figure 2 is a horizontal section on the line x x of fig. 1.

Similar letters of reference indicate corresponding parts.

A is the vertical tube, fitted for attachment to the table of the stand supporting the basin, in the usual way, and provided with the oscillating nozzle B.

It has two passages, C and D, leading from the lower end nearly to the top, where the lateral openings E are made through the said tube for the escape of the water into the nozzle.

Instead of connecting the two water-pipes to this tube by means of branch-pipes tapped into the sides near the bottom, as heretofore, the latter being closed, I propose to extend the passages C D through the bottom, as shown, and attach a forked-pipe connection, F, to the said lower end by screws G, passing through a flange on it into a nut, H, screwing onto the tube A, interposing a packing washer, I, between the ends of the attachment and the pipe, said washer having holes through it coinciding with those of the attachment and the tube.

By this arrangement the joints will be much stronger, tighter, and more durable, and the downward-projecting branches, K, of the attachment are much more conveniently situated for attaching the lead pipes.

Having thus described my invention,

I claim as new and desire to secure by Letters Patent—

The forked and flanged double tube K K F, screws G, nut H, and packing I, combined as described, to form a tight and easily-adjusted joint between the prolonged tubes C D and the water-pipes.

CHARLES A. NEWTON.

Witnesses:
 JOSEPH HORNER,
 ASA C. NEWTON.